(12) United States Patent
He et al.

(10) Patent No.: US 11,562,561 B2
(45) Date of Patent: Jan. 24, 2023

(54) OBJECT VERIFICATION/RECOGNITION WITH LIMITED INPUT

(71) Applicant: ZEBRA TECHNOLOGIES CORPORATION, Lincolnshire, IL (US)

(72) Inventors: Duanfeng He, South Setauket, NY (US); Miroslav Trajkovic, Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 44 days.

(21) Appl. No.: 17/340,828

(22) Filed: Jun. 7, 2021

(65) Prior Publication Data

US 2021/0295043 A1  Sep. 23, 2021

Related U.S. Application Data

(63) Continuation of application No. 16/688,645, filed on Nov. 19, 2019, now Pat. No. 11,062,138.

(51) Int. Cl.
*G06K 9/62* (2022.01)
*G06V 20/10* (2022.01)
*G06N 3/08* (2006.01)

(52) U.S. Cl.
CPC ........... *G06V 20/10* (2022.01); *G06K 9/6256* (2013.01); *G06K 9/6267* (2013.01); *G06N 3/08* (2013.01)

(58) Field of Classification Search
CPC . G06T 2207/20081; G06T 2207/30108; G06T 7/001; G06T 7/33; G06T 2207/10012; G06T 2207/10072; G06T 2207/10081; G06T 2207/10088; G06T 2207/10116; G06T 7/155; G06T 7/174; G06T 7/38; G06T 11/00; G06T 2207/10132; G06T 2207/10136; G06T 2207/20021; G06T 2207/20084; G06T 2207/30016; G06T 5/002; G06T 5/003; G06T 5/50; G06T 7/10; G06K 9/6256; G06K 9/6267; G06K 9/00; G06K 9/00523; G06K 9/6271; G06K 9/6215;

(Continued)

(56) References Cited

U.S. PATENT DOCUMENTS

2004/0147840 A1  7/2004  Duggirala et al.
2007/0014457 A1  1/2007  Jolly et al.

(Continued)

FOREIGN PATENT DOCUMENTS

CN  107122375 A  *  9/2017  ............. G06F 16/51

*Primary Examiner* — Quan M Hua
(74) *Attorney, Agent, or Firm* — Yuri Astvatsaturov

(57) ABSTRACT

Systems and methods for object recognition with limited input are disclosed herein. An example method includes updating a neural network trained to perform object recognition on a first rendition of an object, so that the neural network performs object recognition on a second rendition of the object, using a limited set of input images. The method includes receiving a limited set of model images of the second rendition of the object, accessing a corresponding image mapping, and generating a large number of training images from the limited set, where image mappings include geometric, illumination, and/or obscuration transformations. The neural network is then trained, from this initial small set, to classify the second rendition of the object.

6 Claims, 5 Drawing Sheets

(58) Field of Classification Search
CPC ...... G06K 9/6228; G06K 9/6255; G06N 3/08; G06N 3/0454; G06N 3/0481; G06V 10/764; G06V 10/82; G06V 10/774; G06V 20/00; G06V 20/10; G06V 10/16; G06V 10/28; G06V 10/7715; G06V 10/776; G06V 10/80; G06V 2201/03
See application file for complete search history.

(56) References Cited

U.S. PATENT DOCUMENTS

2007/0179921 A1    8/2007   Zitnick et al.
2020/0160552 A1*   5/2020   Hashimoto ............... G06T 7/62

* cited by examiner

OBJECT VERIFICATION/RECOGNITION WITH LIMITED INPUT

CROSS-REFERENCE TO RELATED APPLICATION

This application is a continuation of U.S. patent application Ser. No. 16/688,645, filed on Nov. 19, 2019, and incorporated herein by reference in its entirety.

BACKGROUND

There is increasing interest in developing machine learning algorithms for use in object recognition systems. Generally speaking, with the current known techniques, a large number of input images are required to properly train a machine learning algorithm, for example, to properly train a neural network to recognize a single object. Commonly, a new, large set of such training images are required for each new object the machine learning algorithm is expected to be able to recognize. That results in considerable processing complexity. And while such processing complexity is acceptable for recognizing completely different objects, that processing complexity presents a problem for objects that are otherwise similar to one another.

Many object recognition systems are faced with objects, that while different, may not vary in appearance drastically. For example, the design of a cereal box may be changed to reflect a new marketing campaign (e.g., recent Olympic champion) or seasonal offerings, even though the box, the identifying barcode, and the content inside remain the same. Currently know machine learning techniques require training a neural network on each such variant (or rendition) of an object. It is desirable, however, to be able train neural networks to recognize an object variant, with a smaller number of input images, in order to reduce complexity, processing time, and ultimately maintenance of the object recognition systems.

SUMMARY

In an embodiment, the present invention is a computer-implemented method for updating a neural network trained to recognize a first rendition of an object. The method comprises receiving, at one or more processors, a plurality of model images of a second rendition of the object, the model images of second rendition of the object satisfy model image conditions; accessing, at the one or more processors, predetermined image mapping between training images captured for the first rendition of the object and model images of the first rendition of the object, wherein the model images of the first rendition of the object satisfy the model image conditions; applying the predetermined image mapping to the plurality of model images of the second rendition of the object to generate training images of the second rendition of the object: and performing updated training on the neural network using the training images of the second rendition of the object.

In a variation of this embodiment, the predetermined image mapping between the training images captured for the first rendition of the object and the model images of the first rendition of the object comprises one or more geometric transformations. In another variation of this embodiment, the predetermined image mapping comprises one or more illumination transformations. In a variation of this embodiment, the predetermined image mapping comprises one or more obscuration transformations.

In a variation of this embodiment, the method includes applying, as the predetermined image mapping, a geometric transformation, an illumination transformation, and an obscuration transformation to generate the training images of the second rendition of the object.

In a variation of this embodiment, performing updated training on the neural network using the plurality of training images of the second rendition of the object comprises: adding the training images of the second rendition of the object to the training images captured for the first rendition of the object; and training the neural network to classify subsequent images as corresponding to either one of the second rendition of the object or the first rendition of the object.

In a variation of this embodiment, performing updated training on the neural network using the plurality of training images of the second rendition of the object comprises: replacing the training images captured for the first rendition of the object with the training images of the second rendition of the object; and training the neural network to classify subsequent images as corresponding to the second rendition of the object.

In another embodiment, the present invention is a system comprising: an imager assembly configured to capture a plurality of model images of an object; and a processor and memory storing instructions that, when executed, cause the processor to: access a predetermined image mapping between training images and model images of a previously-trained object, wherein the object is a rendition of the previously trained object; apply the predetermined image mapping to the plurality of model images of the object to generate training images of the object: and perform updated training on a neural network using generated training images of the object.

In a variation of this embodiment, the memory stores instructions: add the training images of the object to the training images of the previously-trained object; and train the neural network to classify subsequent images as corresponding to either one of the object or the previously-trained object.

In a variation of this embodiment, the memory stores instructions: replace the training images of the previously-trained object with the training images of the object; and train the neural network to classify subsequent images as corresponding to the object, and not to the previously-trained object.

In a variation of this embodiment, the predetermined image mapping comprises geometric transformations.

In a variation of this embodiment, the predetermined image mapping comprises illumination transformations.

In a variation of this embodiment, the predetermined image mapping comprises obscuration transformations.

In a variation of this embodiment, the predetermined image mapping comprises a geometric transformation, an illumination transformation, and an obscuration transformation.

In a variation of this embodiment, the memory stores further instructions to: receive subsequent image data from an imager assembly; analyze, in the neural network, the subsequent image data and classify the subsequent image data as corresponding to the second rendition of the object.

In yet another embodiment, a computer-implemented method for generating training image data for a neural network, the method comprises: receiving, at one or more processors, a plurality of obscured images, each of the obscured images containing an obscured image of a first object, a background portion partially obscured by the first object, and a foreground object portion partially obscuring the first object to create the obscured image of the first object; receiving, at the one or more processors, a first plurality of un-obscured images each containing an un-obscured image of the first object; receiving, at the one or more processors, a second plurality of un-obscured images each containing an un-obscured image of a second object; determining, at the one or more processors, from a comparison of the first plurality of un-obscured images and the second plurality of un-obscured images, a mapping between the un-obscured image of the first object and the un-obscured image of the second object; determining, at the one or more processors, a set of transformations for the first object between the obscured images of the first object in the plurality of obscured images and the un-obscured images of the first object in the first plurality of un-obscured images; and applying the set of transformations and the mapping to the un-obscured images of the second object to generate a set of training images of the second object by replacing the obscured images of the first object in the plurality of obscured images with transformed images of the second object.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
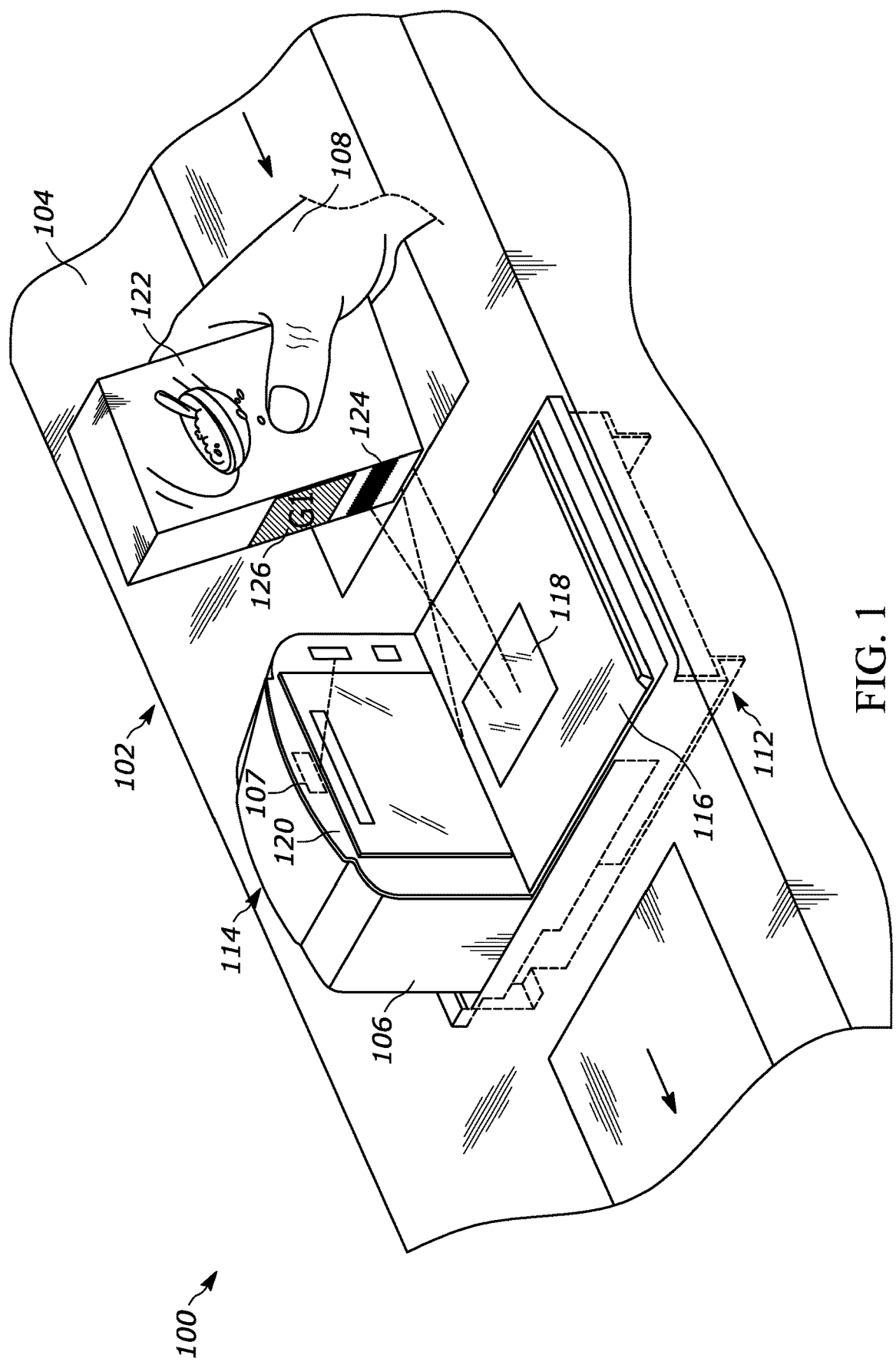
FIG. 1 is a perspective view of an example imaging system, implemented in an example point-of-sale (POS) system, having a bi-optical (also referred to as "bi-optic") imager, showing capture of an image of a first rendition of an object.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present techniques provide systems and methods for performing object recognition with limited input. In particular, the present techniques provide for training an object recognition system, such as a machine learning based object recognition system, with limited numbers of training images. The training techniques herein result in an object recognition system that maintains high recognition accuracy and fast recognition processing times, but that advantageously requires much fewer training images that conventional object recognition techniques.

In various examples, the techniques herein include methods for updating a neural network. For example, in some examples, the present techniques take advantage of neural networks trained to classify a first object, and train those same neural networks to classify other objects similar to that first object, but using a limited set of input images on those other objects. For example, various methods herein include receiving a limited set of model images of a second rendition of an object, accessing an image mapping that was used to train a first rendition of that same object, and generating a large number of training images for the second rendition of the object by applying the image mapping. In this way, the neural network is then trained, from this initial small set, to classify the second rendition of the object.

Previously generated image mappings are used to create training images from a limited set of input images. And by using image mappings for one object to create training images for a second object that is similar to that one object, training of the neural network is achieved in a much faster manner and with a greater degree of accuracy, since similar types of training image sets are used across different objects.

In various examples, the techniques herein for updating a neural network update a neural network trained to recognize a first object so that the neural network can recognize a second object. In various examples, herein the first object and second object bear a relationship. For example, in FIGS. 1 and 2 the first object and the second object are renditions of one another. In another examples, the first and second objects may have another relation, such as a component and sub-component relationship or be scaled versions of one another In yet other examples, the first and second objects are related in that one object is generally similar to the other object. For example, the first object may be a bottle of shampoo, and the second object may be bottle of hand lotion. Or, for example, the first object may be a bottle of shampoo held in someone's hand and the second object may be a bottle of hand lotion held in someone's hand. With the present techniques training images of the hand lotion without the hand and training images of the hand lotion with the hand may be automatically generates using transformations, as described herein.

As discussed, to provide updating training of the neural network, image mappings are used. In some examples, these image mappings may be previously stored image mappings that have been previously used to train a neural network. For example, an image mapping that was previously used to take a first set of model images and convert them to training images may be used to generate a new, second set of training images. In other examples, image mappings are generated from training images, for example, by analyzing a large set of training images and performing imaging processing to identify, from among those training images, a reduced set of presentative images that serve as model images, and further determining transformations between the large set of training images and that reduced set of presentative (model) images. The transformations are then stored as image mappings and may be used to generate a new set of training images, for new objects that are to be recognized by a system.

FIG. 1 illustrates a perspective view of an example imaging system capable of implementing operations of the example methods described herein, as may be represented by the flowcharts of the drawings that accompany this description.

In the illustrated example, an imaging system 100 is in the form of a point-of-sale (POS) system, having a workstation 102 with a counter 104, a bi-optical (also referred to as "bi-optic") barcode reader 106 (that may be used in the object recognition systems and methods described herein), and an additional camera 107 at least partially positioned within a housing of the barcode reader 106. The camera 107 may be referred to as an image acquisition assembly and may be implemented as a color camera or a camera that is configured to obtain non-barcode data, such as images of an object.

Imaging systems herein may include any number of imagers housed in any number of different devices. While FIG. 1 illustrates an example bi-optic barcode reader 106 as the imager, in other examples, the imager may be a handheld device, such as a handheld barcode reader, or a fixed imager, such as barcode reader held in place in a base and operated within what is termed a "presentation mode."

In the illustrated example, the barcode reader 106 includes a lower housing 112 and a raised housing 114. The lower housing 112 may be referred to as a first housing portion and the raised housing 114 may be referred to as a tower or a second housing portion. The lower housing 112 includes a top portion 116 with a first optically transmissive window 118 positioned therein along a generally horizontal plane relative to the overall configuration and placement of the barcode reader 106. In some examples, the top portion 116 may include a removable or a non-removable platter (e.g., a weighing platter). The top portion 116 can also be viewed as being positioned substantially parallel with the counter 104 surface. As set forth herein, the phrase "substantially parallel" means+/−10° of parallel and/or accounts for manufacturing tolerances.

In the illustrated example of FIG. 1, the barcode reader 106 captures images of an object, in particular a product 122, such as for example a box. In some implementations, the barcode reader 106 captures these images of the product 122 through one of the first and second optically transmissive windows 118, 120. For example, image capture may be done by positioning the product 122 within the fields of view FOV of the digital imaging sensor(s) housed inside the barcode reader 106. The barcode reader 106 captures images through these windows 118, 120 such that a barcode 124 associated with the product 122 is digitally read through at least one of the first and second optically transmissive windows 118, 120.

In the illustrated example of FIG. 1, additionally, the barcode reader 106 captures images of the product 122 using the camera 107, which captures images and generates image data that can be processed to verify that the product 122 scanned matches the barcode 124 and/or image data can be used to populate a database.

Figure 4:
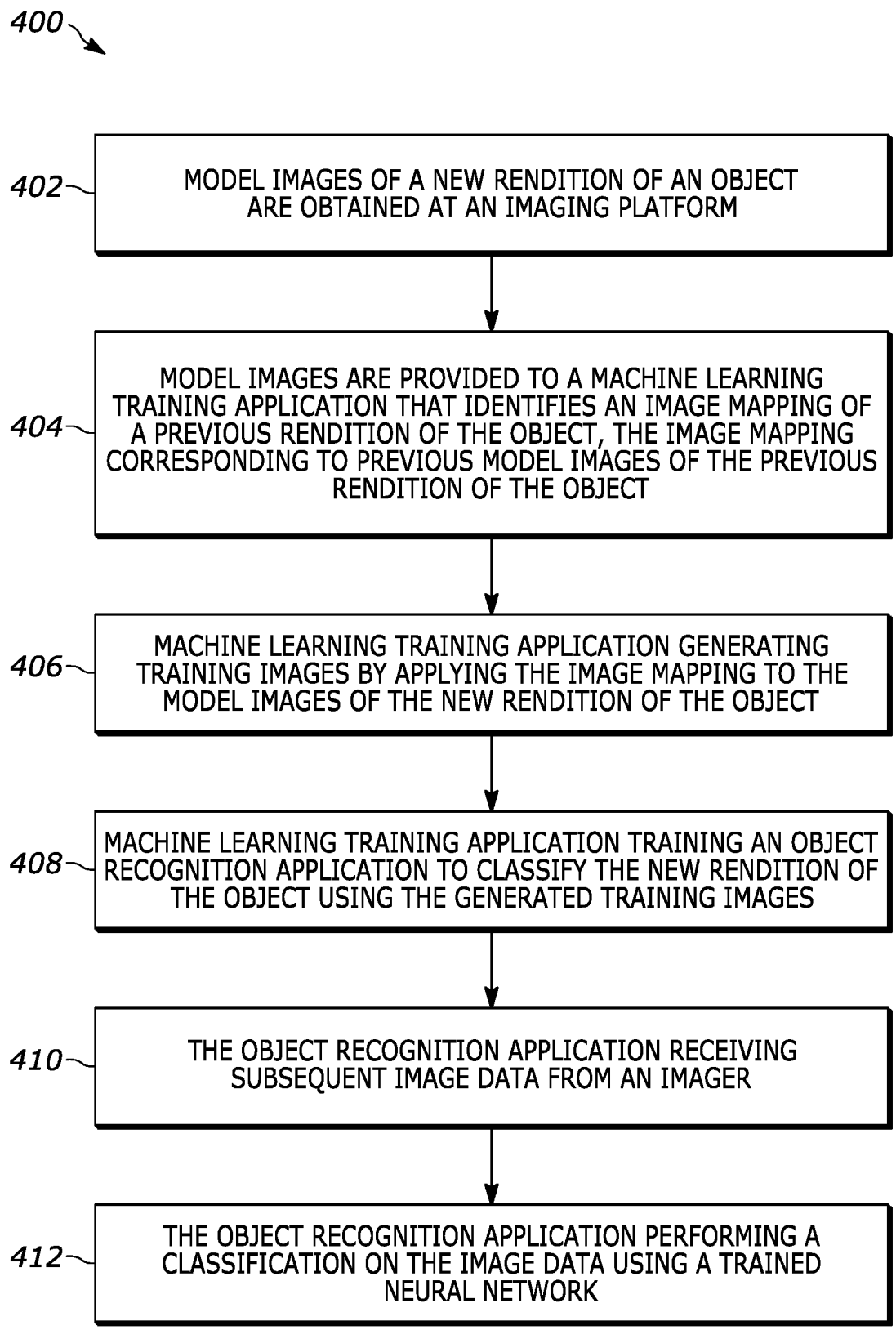
FIG. 4 is a block diagram of an example process as may be implemented by the logic circuits of FIG. 3, for implementing example methods and/or operations described herein.
Figure 5:
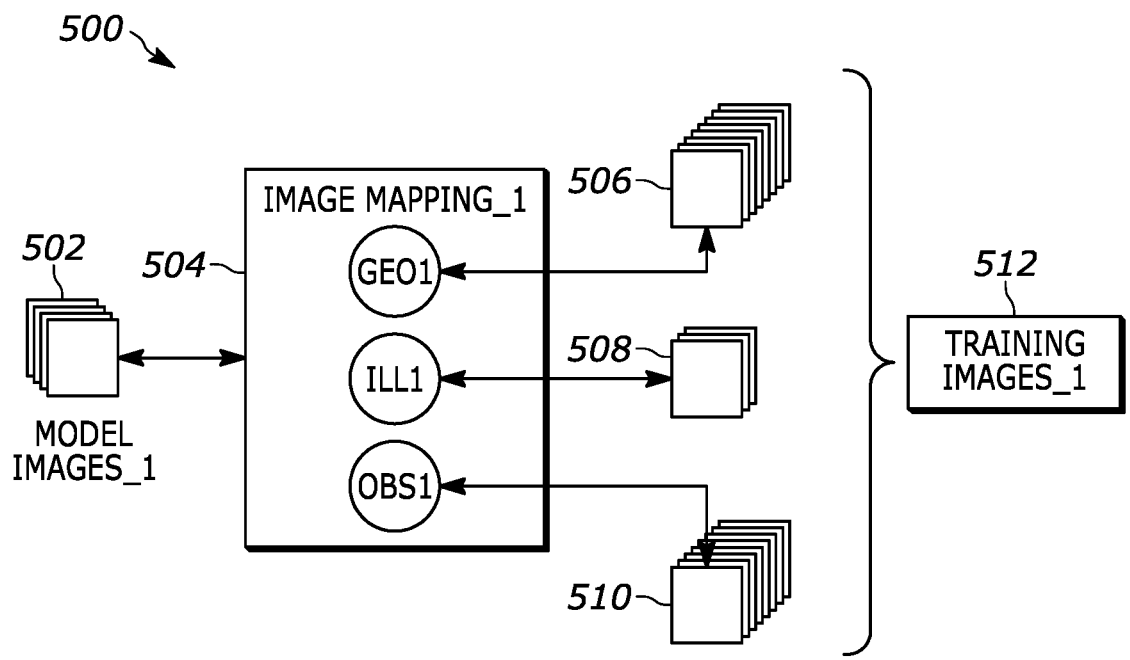
FIG. 5 is a schematic diagram of an example process flow corresponding to aspects of the example process in FIG. 4.
Figure 5:
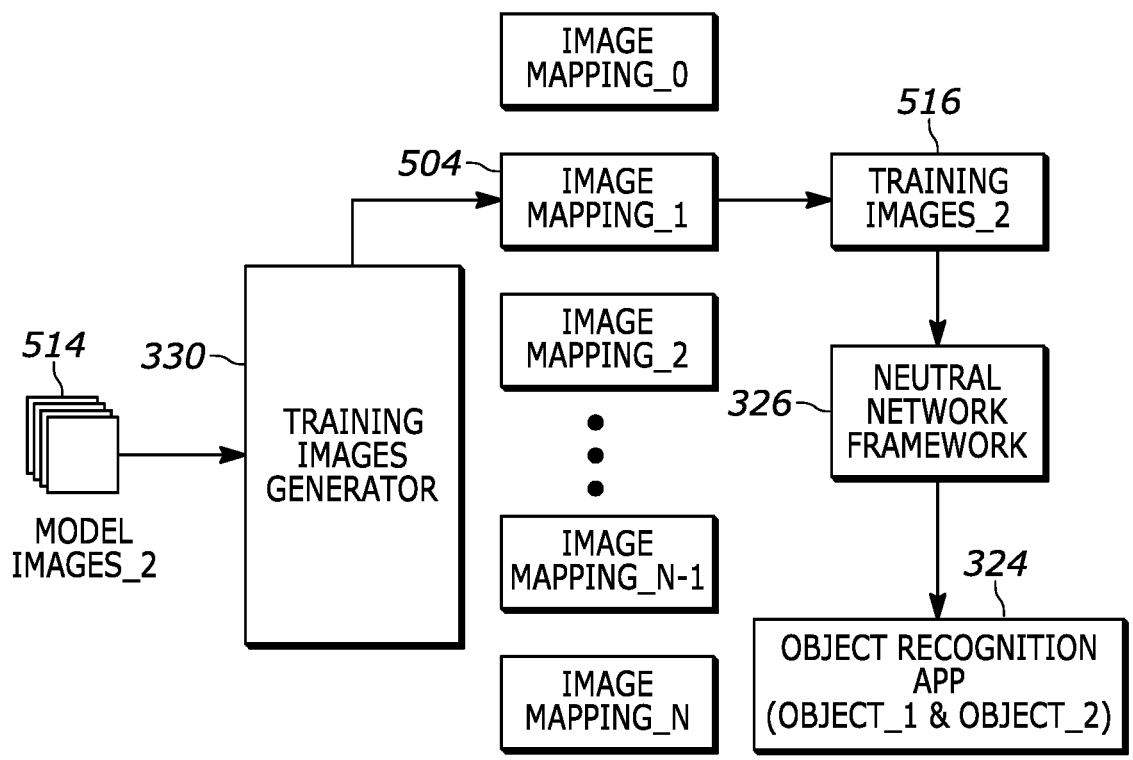

To implement operations of the example object recognition techniques herein, including those of FIGS. 4 and 5, images captured through any of the windows 118, 120 or the camera 107 may be used for training a machine learning classifier, in a training mode, and for performing object recognition (i.e., classification), in an operating mode of the barcode reader 106. In some examples, the training mode is performed with a remote processing system, such as at a classification server communicatively coupled to the barcode reader 106. The classification server may train a neural network and instantiate that trained neural network on the barcode reader 106 for use during the operating mode.

Figure 2:
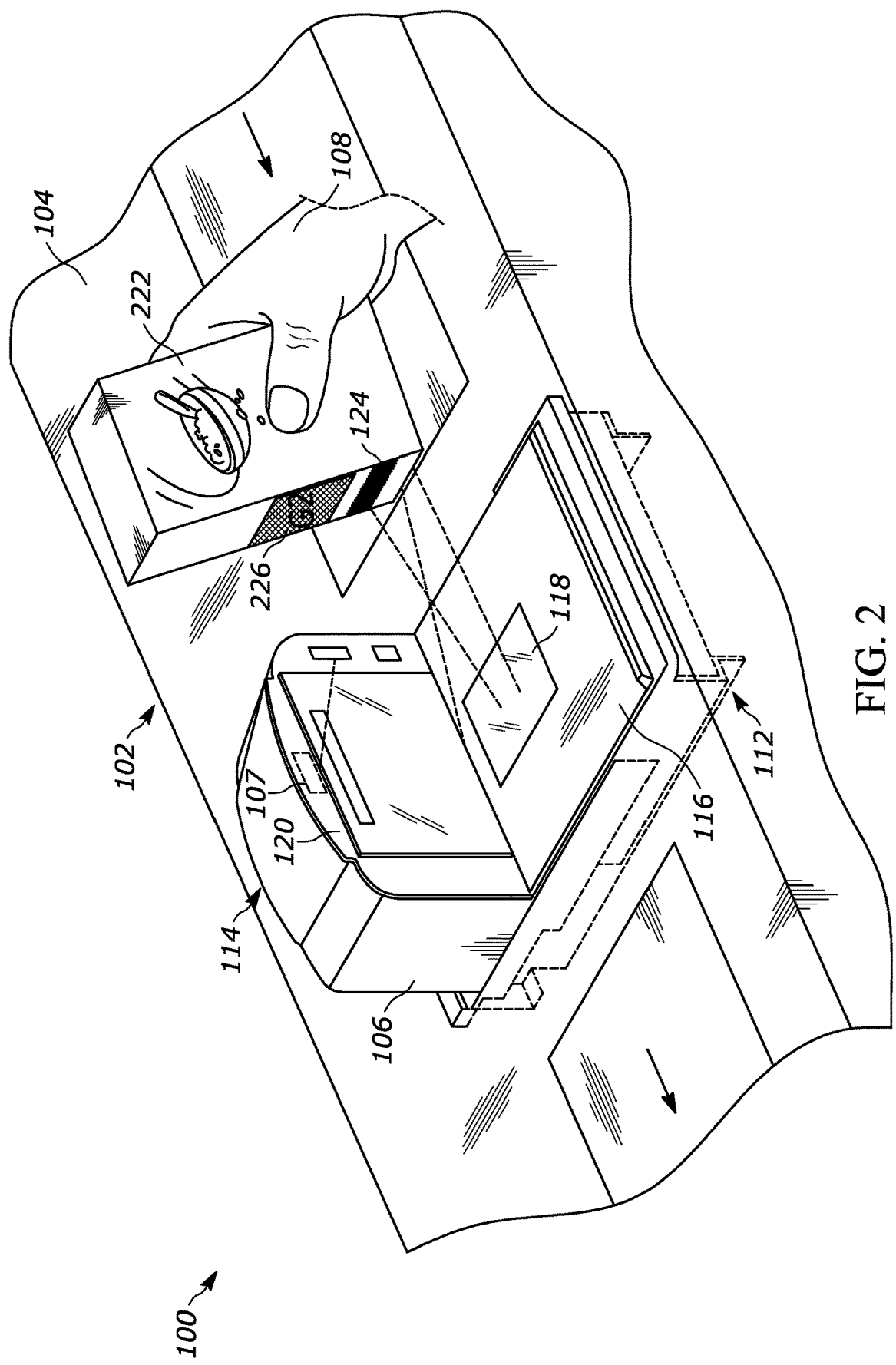
FIG. 2 is a perspective view of the example imaging system of FIG. 1 showing capture of an image of a second rendition of the object.

In the example of FIG. 1, the product 122 is a first rendition of an object, as evident by the product 122 having a first graphical display 126 captured in images by the barcode reader 106. In the example of FIG. 2, the product 122 has been replaced with a similar but, different product 222, that is a second rendition of the same object. That is, in FIG. 2, the product 222 may have the same barcode 124, the same overall shape, but differ from the product 122 by virtue of a second graphical display 226. In other examples, the product 222 may be entirely different than the product 122 and have different barcode.

Figure 3:
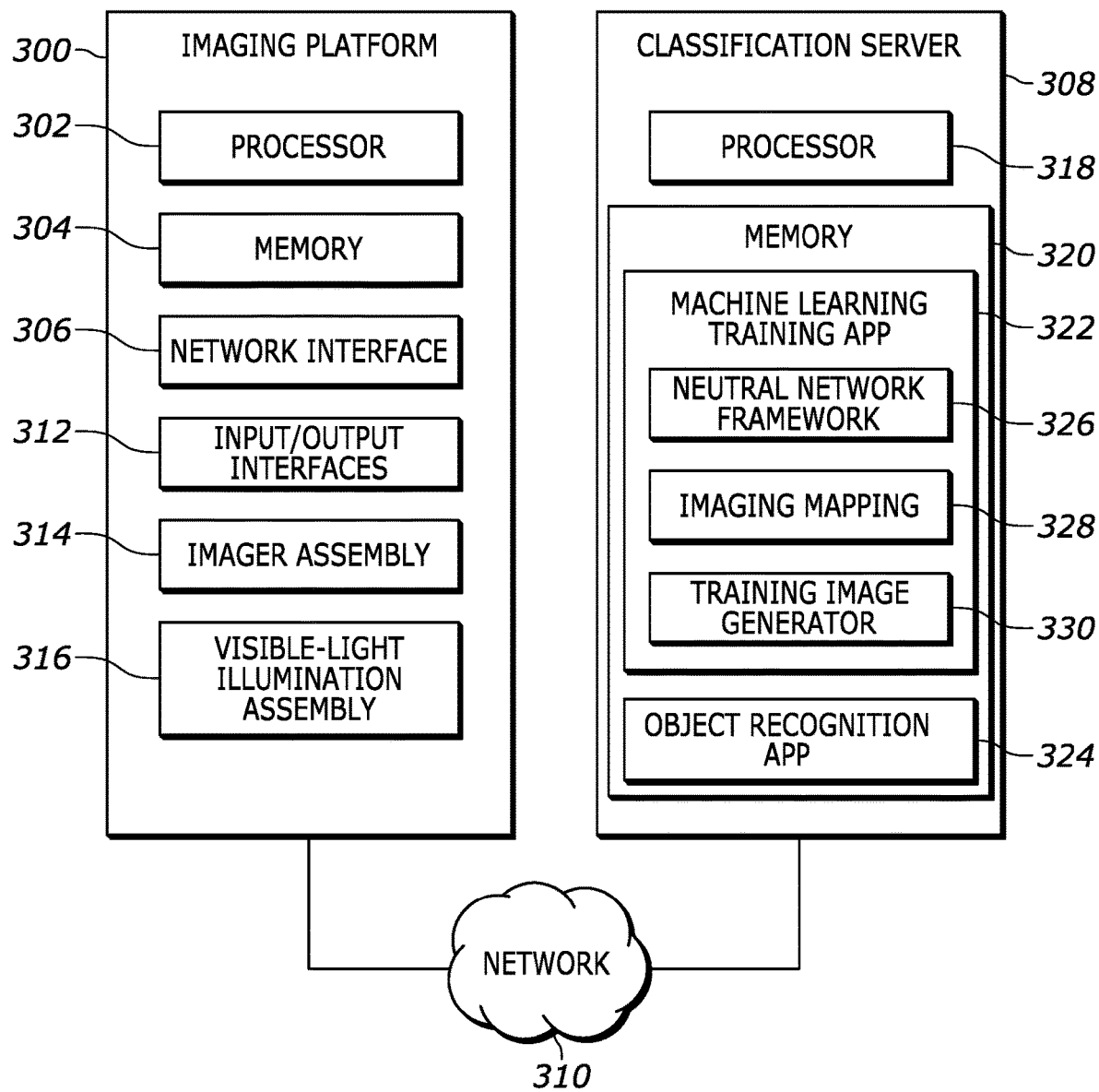
FIG. 3 is a block diagram of example object recognition logic circuits of the imaging system of FIGS. 1 and 2 and a classification server, for implementing example methods and/or operations described herein.

FIG. 3 is a block diagram representative of an example logic circuit capable of implementing, for example, one or more components of the imaging system 100 of FIGS. 1 and 2. The example logic circuit of FIG. 3 includes an imaging platform 300 capable of executing instructions to, for example, implement operations of the example methods described herein, as may be represented by the flowcharts of the drawings that accompany this description, including those of FIGS. 4 and 5. Other example logic circuits capable of, for example, implementing operations of the example methods described herein include field programmable gate arrays (FPGAs) and application specific integrated circuits (ASICs).

The example imaging platform 300 of FIG. 3 includes a processor 302 such as, for example, one or more microprocessors, controllers, and/or any suitable type of processor. The example imaging platform 300 of FIG. 3 includes memory (e.g., volatile memory, non-volatile memory) 304 accessible by the processor 302 (e.g., via a memory controller). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the imaging platform 300 to provide access to the machine-readable instructions stored thereon.

The example imaging platform 300 of FIG. 3 also includes a network interface 306 to enable communication with other machines via, for example, one or more networks, including, in the illustrated example, with a classification server 308 through a network 310. The example network interface 306 includes any suitable type of communication interface(s) (e.g., wired and/or wireless interfaces) configured to operate in accordance with any suitable protocol(s) for communicating over the network 310.

The example, imaging platform 300 of FIG. 3 also includes input/output (I/O) interfaces 312 to enable receipt of user input and communication of output data to the user.

The imaging platform 300 further includes an imager assembly 314 to capture images of objects within a FOV of the image platform 300. In some examples, the imager assembly 314 includes multiple images, such as two imagers one behind each of windows 118 and 120, in the example of the barcode reader 106, and one a camera, such as the camera 107 in the barcode reader 106. In some examples, the imager assembly 314 is a multi-color imager, able to capture images at a plurality of different colors or wavelengths, whether discrete wavelengths or over a wavelength spectrum such as the visible spectrum. In some examples, the imaging platform 300 further includes visible-light illumination assembly 316 that may be configured to emit visible light over a portion of the FOV of the imaging assembly 300 to illuminate targets within the FOV. For instance, in examples in which the imaging platform is a barcode reader in a bi-optic barcode reader, the FOV of the imaging platform 300 may be directed through the generally horizontal window of the housing or through the generally vertical window. In examples in which the imaging platform 300 is implemented through a handheld barcode reader or other imaging apparatus, the FOV of the imaging assembly 300 may be directed through the one window of the housing thereof.

In the example of FIG. 3, the classification server 308 is configured to receive image data from the imaging platform 300, through the network 310, and process that image data to train a neural network, during a training mode. Once the classification server 308 has a trained neural network, the classification server 308 is further configured to receive subsequent image data from the imaging platform 300 and identify an object from that image data, during an operating mode.

In the illustrated example, the classification server 308 may include one or more general-purpose (e.g., microcontrollers and/or microprocessors) or special-purpose processors 318 and a memory 320 storing instructions that, when executed, implement operations of the example methods described herein, including those of FIG. 4. The memory 320, like the memory 304, may be a non-transitory memory and can include one or several suitable memory modules, such as random access memory (RAM), read-only memory (ROM), flash memory, other types of persistent memory, etc.

In the illustrated example, the memory 320 includes, e.g., a machine learning training application 322 and an object recognition application 324. The machine learning model training application 322 may be configured to train a machine-learning object recognition model within the object recognition app 324, by analyzing image data received from the imaging platform 300 and training the object recognition app 324 to recognize objects.

In the illustrated example, the machine learning training application 322 includes one or more machine learning algorithms forming at least part of a neural network framework 326. The machine learning training application 322 further includes a stored imaging mapping 328 and a training images generator 330. It will be understood that, in some examples, the neural network framework 326 extends to operate within both the machine learning training app 322 and the object recognition app 324. In some examples, the object recognition app 324 is instantiated on both the classification server 308 and the imaging platform 300, which may result in faster object recognition in the operating mode.

The neural network framework 326 may be configured as a trained prediction model assessing received images of an object (with or without indicia) and classifying those images to identify the object among possible objects in a retail environment, warehouse environment, distribution environment, etc. That determination may be used to approve or reject an attempted purchased at a Point-of-Sale, for example. In various examples herein, a prediction model is trained using a neural network, and as such that prediction model is referred to herein as a "neural network" or "trained neural network." The neural network herein may be configured in a variety of ways. In some examples, the neural network may be a deep neural network and/or a convolutional neural network (CNN). In some examples, the neural network may be a distributed and scalable neural network.

The neural network may be customized in a variety of manners, including providing a specific top layer such as but not limited to a logistics regression top layer. A convolutional neural network can be considered as a neural network that contains sets of nodes with tied parameters. A deep convolutional neural network can be considered as having a stacked structure with a plurality of layers. In examples herein, the neural network is described as having multiple layers, i.e., multiple stacked layers, however any suitable configuration of neural network may be used. CNNs, for example, are a machine learning type of predictive model that are particularly using for image recognition and classification. In the exemplary embodiments herein, for example, CNNs can operate on 2D or 3D images, where, for example, such images are represented as a matrix of pixel values within the image scan data. As described, the neural network (e.g., the CNNs) can be used to determine one or more classifications for a given image by passing the image through the series of computational operational layers. By training and utilizing these various layers, the CNN model can determine a probability that an image or physical image features belongs to a particular class, e.g., a particular object in a retail environment. Trained CNN models can be persisted for restoration and use, and refined by further training. Trained models can reside on any in-premise computer volatile or non-volatile storage mediums such as RAM, flash storage, hard disk or similar storage hosted on cloud servers.

The stored imaging mapping 328 may be stored data, such as a stored database, or stored instructions, such as instructions for image transformations, including, instructions for geometric transformations, illumination transformations, and obscuration transformations. The training images generator 330 accesses the imaging mapping 328 and is configured to apply the imaging mapping 328 to image data received at the classification server 308.

While the machine learning training application 320 and the object recognition application 324 are shown separately within the memory 320, in some examples, these applications may be combined within the classification server 308.

While the machine learning training application 320 and the object recognition application 324 are shown within the classification server 308 in the example of FIG. 3, in various other examples, all of some portions of either or both of the applications 320, 324 may be implemented in the imaging platform 300. That is, in some examples, all or some of the applications 320, 324 may be implemented in the imaging system 100, such as the barcode reader 106.

FIG. 4 is a block diagram of an example process 400 for updating a neural network trained to identify an object, as may be performed by the imaging system 100 and the barcode reader 106 of FIGS. 1 and 2, and by the imaging platform 300 and classification server 308 of FIG. 3. Initially, at a process 402, the imaging platform 300 obtains one or more model images of an object, in particular one or more images of a new rendition of a previously-trained for object. In various embodiments, the model images of the new rendition are obtained from a remote server having stored thereon previously captured model images. The model images may be images captured by any imaging system. In some embodiments, the model images are provided by a manufacturer of the object. In some embodiments, model images are captured by the actual imaging platform 300 itself. For example, the model images may be captured by imagers such as the imager assembly 314. In the example of the barcode reader 106, the model images may be captured by the camera 107 or through one or both of the windows 118, 120, as captured by imagers behind these windows.

In various embodiments, model images are images of an object that satisfy model image conditions, established to provided uniformity of imaging training and to further reduce the number of images needed by the machine learning training applications herein to train object recognition applications. These model image conditions may be model orientations for an object, such as particular orientations of the top, bottom, and/or sides of the object relative to the imager capturing the images. These model image conditions may be orientations such as the range of distances between the object and the imager, the faces of the object that are captured by images, the tilt of the object in captured images. In some examples, the model image conditions are static and apply for each different object. In some examples, the model image conditions vary across different objects. For objects that are different renditions of one another, in various embodiments, the model image conditions will be the same. The model image conditions may be stored in a memory, such as the memory 320 of the classification sever 308, as a series of image templates, for example. The model image conditions can be coded data embedded within image data and identifying the model image conditions for the image, such as a code indicating the orientation of the object captured in the corresponding image.

At a process 404, the model images of the second rendition of the object are provided to a machine learning training application, such as application 322 in the classification server 308, and, more particularly, the training image generator 330. In some embodiments, machine learning training application analyzes the received model images and determines a previously determined imaging mapping corresponding to a previous rendition of the object captured within the received model images.

In various examples, the imaging mapping contains one or more transformations that have been applied to previous model images and used to generate a set of training images from those model images.

In various other examples, the image mapping are generated by a classification server analyzing training images (such as those used by a machine learning training application) and identifying model images from those training images, and then further identifying the image mapping as one or more transformations that are used to reduce the large training images set to the limited model images set.

In either of these examples, the image mapping contains one or more transformations from going from a limited image set to a sufficiently large (and much larger) training image set.

In various examples, the transformations contained in the imaging mapping are geometric transformations. Geometric transformations represent functions that map structures from one image to another image transforming the shape of the structures in the process. Example geometric transformations include translations, rotations, scaling, reflections, shearing, and concatenating. Other geometric transformations include affine transformations, projective transformations, conformal transformations, and equiareal transformations. Geometric transformations may be transformations to be applied to an entire model image or to be applied to only a portion thereof. For example, geometric transformations of the imaging mapping may be transformations that are to be applied after a structure in an image has been identified and segmented through image processing.

In various embodiments, the imaging mapping contains illumination transformations, which may include transformations in the brightness, contrast, color temperature, shading, and colorspace.

In various embodiments, the imaging mapping contains obscuration transformations. Obscuration transformations include transformations that fully or partially block portions or all of a model image, such as by making various pixels in the model image data white or black. Obscuration transformations include transformations that maintain foreground objects blocking a portion of object, such that these foreground objects are maintained as a new set of obscured images are generated for the second object. For example, if an image of a first object includes a portion of a hand holding the object and obscuring it, then the training images of the second object are generated with the same obscuring hand.

At a process 406, the machine learning application (e.g., for example the training image generator 330) applies the image mapping identified at process 404 to the received model images to generate a set of training images, where these training images are of the new rendition of the object. The training images are thus generated from any number of transformations, including any of geometric transformations, illumination transformations, and/or obscuration transformations. In any example the image mapping from process 404 will have sufficient permutations of these transformations to generate 10× or greater, 100× or greater, 1000× or greater, or 10000× or greater numbers of training images as compared to the numbers of input model images. For example, if the process 402 receives 10 model images of a new rendition of an object, an image mapping may be selected to generate, at the process 406, 100 (10×), 1000 (100×), 10000 (1000×), or great numbers of training images, each different from one another based on the transformation of combination of compound transformations that have been applied to one of the model images.

In various examples, image mappings will differ for different types of objects, with some image mappings have larger number of transformations than others. Furthermore, image mappings may differ from one another in depth-depth referring to the number of compounding of transformations that may be applied to a single model image.

FIG. 5 is a schematic of an example process flow 500 that may be executed by the imaging platform 300 and the classification server 308 executing part of the process 400 in FIG. 4. A set of initial model images 502 (model images_1) of a first rendition of an object is provided as input images that are transformed using an particular image mapping 504 (image mapping_1). In the illustrated example, image mapping 504 includes three different transformation classes, a geometric transformation class (geoi) that generates a first set of transformed images 506, an illumination transformation class (illi) that generates a second set of transformed images 508, and an obscuration transformation class (obsi) that generates a third set of transformed images 510, where each of the sets of images 506, 508, and 510 contained a different number of images, in the illustrated example, but where collectively they form training images 512 (training images_1) for this first rendition of the object.

In various examples, the foregoing part of process flow 500 may happen in reverse, as shown by the arrows. That is, in some example, the training images 512 for a first rendition of an object are provided to the classification server 308, which analyzes the training images 512 and automatically determines, through image analysis, a series of transformations to generate the model images 502 of the first rendition of the object. In this example, those series of transformations are then stored as the image mapping 504 for subsequent use in training a neural network on a new set of model images to recognize a second rendition of the object.

Still referring to FIG. 5, to generate training images for a second rendition of the object, modal images 514 (model images_2) of the second rendition of the object are objected and provided to the training images generator 330, which identifies, from among a plurality of image mappings for different objects (image mapping_0, image mapping_1, . . . , image mapping_N−1, image mapping_N, where N is the total number of objects for which the object recognition application 324 has been trained to identify), the particular image mapping corresponding to the object, i.e., the image mapping 504 in the instant example. The identified image mapping 504 is then used to generate plurality of training images 516 (training images_2) for the second rendition, e.g., by applying the transformations defined by the image mapping 504.

Returning to FIG. 4, at a process 408, the machine learning application trains the objection recognition application to classify the new rendition of the object using the generated training images. In the example process 500 of FIG. 5, the neural network framework 326 uses the training images 516 as inputs to a neural network within the object recognition app 324 thereby training the app 324 with a new classification, i.e., for the new rendition. In some examples, the process 408 is configured to add the training images generated for the new rendition of the object (e.g., training images 516) to the training images previously generated for the first rendition of the object (e.g., training images 512) and train the neural network of the object recognition app 324 to classify subsequent images as corresponding to either one of the second rendition of the object or the first rendition of the object. In some examples, the process 408 is configured replace the training images for the first rendition of the object (e.g., training images 512 in FIG. 5) with the training images of the second rendition of the object (e.g., training images 516 in FIG. 5) and train the neural network of the object recognition app 324 to classify subsequent images as corresponding to the second rendition of the object only. The latter configuration may be used, for example, when the second rendition of the object is to replace the first rendition of the object. The latter configuration may be used to remove trained classifiers that have been designated as no longer useful, such as classifiers for older object, classifiers that have not been used in a certain amount of time, or based on other factors.

In the process 400 of FIG. 4, with the object recognition application trained to classify the new rendition, during an operating mode, when subsequent image data is collected at process 410 (for example, collected from an imager, such as the imager assembly 314 of FIG. 3 or the barcode reader 106 of FIGS. 1 and 2), the object recognition application then performs applies the subsequent image data to its trained neural network classifier to determine, at a process 412, whether the subsequent image data is to be classified as corresponding to the new rendition of the object, a previously-trained rendition of the object, another object entirely, or unclassifiable.

In various examples, the present techniques include a method for generating training image data for a neural network, where obscured training images of a first object are used to generate obscured training images of a second object. The method may be performed entirely at a classification server, entirely at an imaging platform, or some combination of the two. In an example, the method includes receiving a plurality of obscured images, each of the obscured images containing an obscured image of a first object, a background portion partially obscured by the first object, and a foreground object portion partially obscuring the first object to create the obscured image of the first object. The method further includes receiving a first plurality of un-obscured images each containing an un-obscured image of the first object, and receiving a second plurality of un-obscured images each containing an un-obscured image of a second object. In an example, a classification server then determines from a comparison of the first plurality of un-obscured images and the second plurality of un-obscured images, a mapping between the un-obscured image of the first object and the un-obscured image of the second object. The classification server further determines a set of transformations for the first object between the obscured images of the first object in the plurality of obscured images and the un-obscured images of the first object in the first plurality of un-obscured images. The classification server then applies the set of transformations and the mapping to the un-obscured images of the second object to generate a set of training images of the second object by replacing the obscured images of the first object in the plurality of obscured images with transformed images of the second object. The transformed images of the second object may be obscured images, while in other examples, they may be un-obscured images. Similar to the other techniques herein using a set of transformations allows the transformed images of the second object to have the same position, angle, illumination, and obscuration as the obscured image of the first object.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A computer-implemented method for generating training image data for a neural network, the method comprising:
   receiving, at one or more processors, a plurality of obscured images, each of the obscured images containing an obscured image of a first object, a background portion partially obscured by the first object, and a foreground object portion partially obscuring the first object to create the obscured image of the first object;
   receiving, at the one or more processors, a first plurality of un-obscured images each containing an un-obscured image of the first object;
   receiving, at the one or more processors, a second plurality of un-obscured images each containing an un-obscured image of a second object;
   determining, at the one or more processors, from a comparison of the first plurality of un-obscured images and the second plurality of un-obscured images, a mapping between the un-obscured image of the first object and the un-obscured image of the second object;
   determining, at the one or more processors, a set of transformations for the first object between the obscured images of the first object in the plurality of obscured images and the un-obscured images of the first object in the first plurality of un-obscured images; and applying the set of transformations and the mapping to the un-obscured images of the second object to generate a set of training images of the second object by replacing the obscured images of the first object in the plurality of obscured images with transformed images of the second object.

2. The computer-implemented method of claim 1, wherein the transformed images of the second object are transformed obscured images of the second object.

3. The computer-implemented method of claim 1, wherein the transformed images of the second object are transformed un-obscured images of the second object.

4. The computer-implemented method of claim 1, wherein the transformed images of the second object have the same position, angle, illumination, and or obscuration as the obscured image of the first object.

5. The computer-implemented method of claim 1, wherein the set of transformations comprises geometric transformations, illumination transformations, and/or obscuration transformations.

6. The computer-implemented method of claim 1, further comprising training the neural network to recognize the second object by providing the set of training images of the second object to the neural network.

\* \* \* \* \*